(12) United States Patent
Zanini et al.

(10) Patent No.: US 8,256,473 B2
(45) Date of Patent: Sep. 4, 2012

(54) SUPPORTING AND WEIGHING DEVICE FOR CONTAINERS

(75) Inventors: Gianpietro Zanini, Montanara di Curtatone (IT); Marco Baroni, Barbasso di Roncoferraro (IT)

(73) Assignee: Azionaria Costruzioni Macchine Automatiche A.C.M.A. S.p.A. (IT)

( * ) Notice: Subject to any disclaimer, the term of this patent is extended or adjusted under 35 U.S.C. 154(b) by 1045 days.

(21) Appl. No.: 12/223,191

(22) PCT Filed: Feb. 13, 2007

(86) PCT No.: PCT/IB2007/000328
§ 371 (c)(1),
(2), (4) Date: Jul. 24, 2008

(87) PCT Pub. No.: WO2007/093878
PCT Pub. Date: Aug. 23, 2007

(65) Prior Publication Data
US 2010/0175784 A1    Jul. 15, 2010

(30) Foreign Application Priority Data
Feb. 14, 2006   (IT) .............................. BO2006A0108

(51) Int. Cl.
B65B 1/30        (2006.01)
(52) U.S. Cl. ...................................... 141/82
(58) Field of Classification Search ................... 141/83, 141/144, 234
See application file for complete search history.

(56) References Cited

U.S. PATENT DOCUMENTS

| | | | |
|---|---|---|---|
| 4,832,092 A | 5/1989 | Hirose | |
| 6,073,667 A | 6/2000 | Graffin | |
| 6,644,363 B2* | 11/2003 | Sogliani et al. | 141/83 |
| 6,810,927 B2* | 11/2004 | Ronchi | 141/146 |
| 7,325,578 B2* | 2/2008 | De Antoni Migliorati et al. | 141/83 |

FOREIGN PATENT DOCUMENTS

| | | |
|---|---|---|
| EP | 1 243 546 A2 | 9/2002 |
| FR | 2 168 696 A | 8/1973 |
| FR | 2 603 017 A1 | 2/1988 |
| FR | 2 770 292 A1 | 4/1999 |

* cited by examiner

Primary Examiner — Gregory Huson
Assistant Examiner — Jason K Niesz
(74) Attorney, Agent, or Firm — Timothy J. Klima; Shuttleworth & Ingersoll, PLC (57) ABSTRACT

A container supplied to a carousel type filling unit is directed onto a supporting and weighing device (1) that presents a hollow body (12) attached to the carousel and housing a load cell. The hollow body (12) is equipped with a pedestal (19) presenting a platform (20) on which to stand the container, and a connecting element (21) of which a first end (21*a*) is coupled with the load cell internally of the hollow body (12) and a second end (21*b*), opposite to the first end (21*a*), is secured to the platform (20). To advantage, the first end (21*a*) of the connecting element (21) is seated in a through opening (13) afforded by the underside of the hollow body (12).

16 Claims, 6 Drawing Sheets

SUPPORTING AND WEIGHING DEVICE FOR CONTAINERS

SPECIFICATION

This application claims priority to Italian Patent application number BO2006A000108, filed Feb. 14, 2006, which is incorporated by reference herein.

This application is the National Phase of International Application PCT/I132007/000328 filed Feb. 13, 2007 which designated the U.S. and that International Application was published under PCT Article 21(2) in English.

TECHNICAL FIELD

The present invention relates to a supporting and weighing device for containers.

The invention finds application advantageously in the art field of equipment for filling containers with a variety of different substances, for example liquid food products such as milk or fruit juices, and non-food products such as mineral lubricating oils, detergents, etc.

BACKGROUND ART

The prior art embraces units for filling containers with liquid or powder products, equipped with a carousel carrying a plurality of devices designed to support the containers, each associated with a respective dispensing device by which a predetermined quantity of material is made to fall into a container placed on the support device.

The operation of the single dispensing device is interlocked to respective weighing means housed in the support device and able to sense the weight of the container continuously. At a given moment during the filling step when the weighing means indicate that a predetermined weight has been reached, signifying that the container is full, the dispensing device will terminate the flow of liquid or powder material, for example by closing a shut-off valve on a feed duct through which the material is dispensed.

As a general rule, weighing means take the form of a dynamometer housed within a hollow body located beneath a pedestal on which the container is placed. The pedestal carries a plunger insertable through a hole in the top of the hollow body. Thus, the plunger is located partly within the hollow body and able to interact with the dynamometer.

Conventional units of the type outlined above are washed down periodically so as to remove any spills or splashes of the liquid or powder products with which the containers are filled. In the course of filling operations, more exactly, part of the liquid or powder product can escape from the containers and drop onto the pedestal of the support device, onto the hollow body or onto the carousel.

At the end of a given production run, accordingly, nozzles are activated to direct a washing liquid onto the carousel, especially onto those areas where the spills or splashes are most heavily concentrated.

The washing process in question is a cause of major drawbacks however, due to the infiltration of washing liquid through the hole in the hollow body.

In effect, the dynamometer components include a piezoelectric material, and electronic parts that are easily damaged if brought into contact with a liquid.

Furthermore, the presence of the washing liquid on the plunger and in the hole of the hollow body can impede the correct movement of the selfsame plunger toward and away from the weighing means, with the result that errors occur during the step of weighing the container. Over time, in fact, moving mechanical parts of the support and weighing device can be rusted by any liquid sediments that linger.

The object of the present invention is to provide a supporting and weighing device for containers that will be unaffected by the drawbacks mentioned above.

In particular, the object of the present invention is to provide a supporting and weighing device for containers, which can undergo washing operations without suffering damage.

DISCLOSURE OF THE INVENTION

The stated object is realized, according to the present invention, in a device for supporting and weighing containers comprising: a hollow body such as can be associated with a respective unit for filling at least one container; means, located in the hollow body, by which to weigh the container; and at least one pedestal supporting the container, composed of a platform on which to stand the selfsame container, and a connecting element presenting a first end associated with the weighing means, and a second end, opposite to the first end, associated with the platform, characterized in that the first end of the connecting element is seated in a through opening afforded by the underside of the hollow body.

The invention will now be described in detail, by way of example, with the aid of the accompanying drawings, in which.

Figure 1:
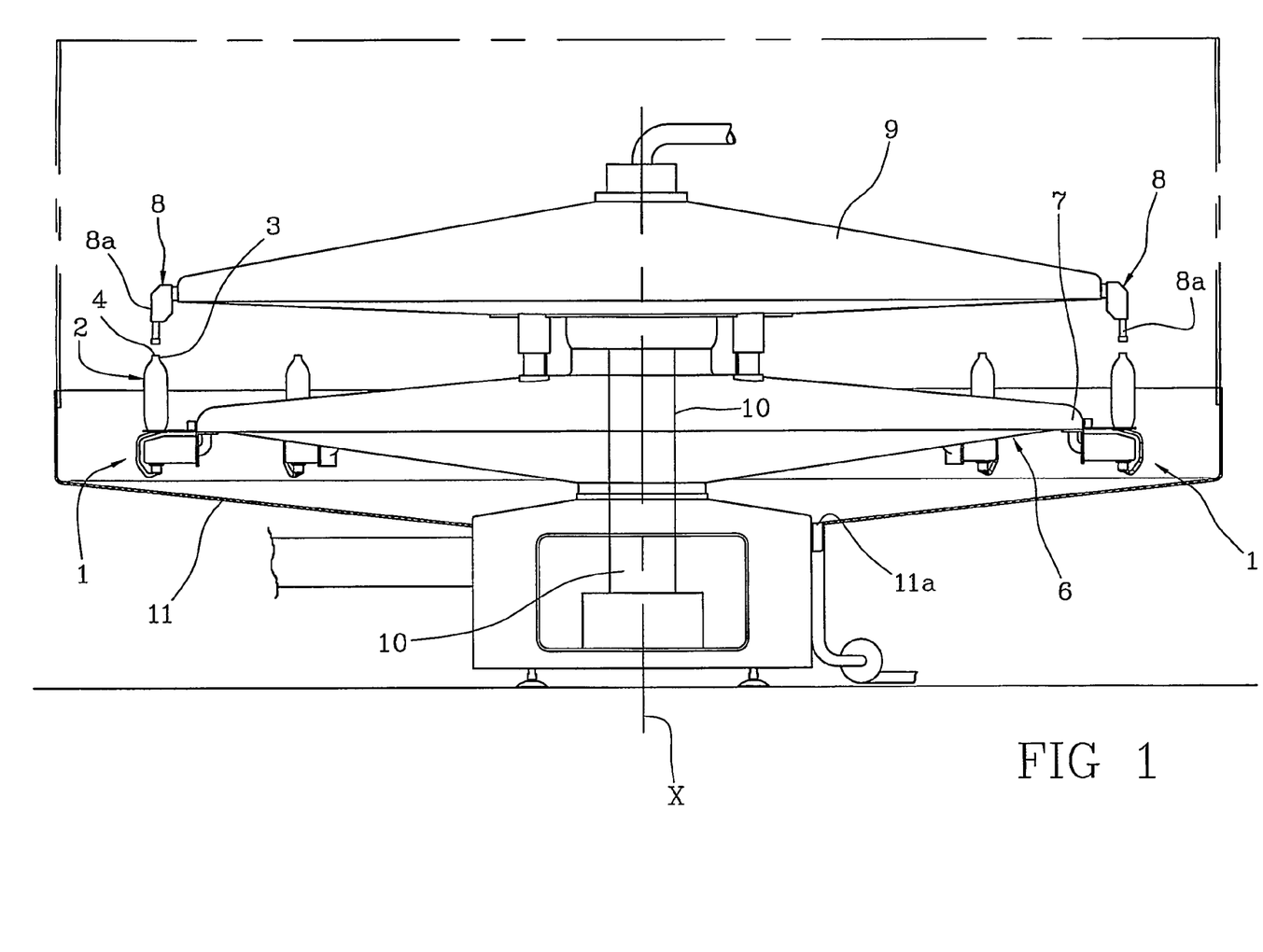
FIG. 1 shows a container filling unit equipped with the device for supporting containers according to the present invention, viewed in a side elevation.

With reference to FIG. 1, numeral 1 denotes a device, considered in its entirety, for supporting containers 2, each presenting a neck 3 and a filler mouth 4 closed by fitting a cap.

As discernible in FIG. 1, the device 1 finds application advantageously in a filling unit 5 by which liquid or powder products are batched into containers 2 of the type in question.

In particular, and as illustrated schematically in FIG. 1, the unit 5 comprises a carousel 6 rotatable about a respective vertical axis X.

The carousel 6 consists in a revolving plate and affords a plurality of peripheral stations 7 by which the containers 2 are accommodated. Each peripheral station 7 comprises a respective supporting device 1 embodied in accordance with the present invention, which will be illustrated more fully in the course of the present specification.

The filling unit 5 further comprises a plurality of dispensing elements 8, each located above a relative supporting device 1, by which a liquid or powder product is directed into the respective container 2 beneath.

Such dispensing elements 8 are embodied preferably as nozzles 8a mounted to the periphery of a frame 9. Both the frame 9 and the carousel 6 are coupled to a shaft 10 presenting a longitudinal dimension parallel to the aforementioned axis X of rotation. During the step of filling the containers 2, accordingly, the carousel 6 and the frame 9 are caused to rotate as one about the vertical axis X.

Figure 6:
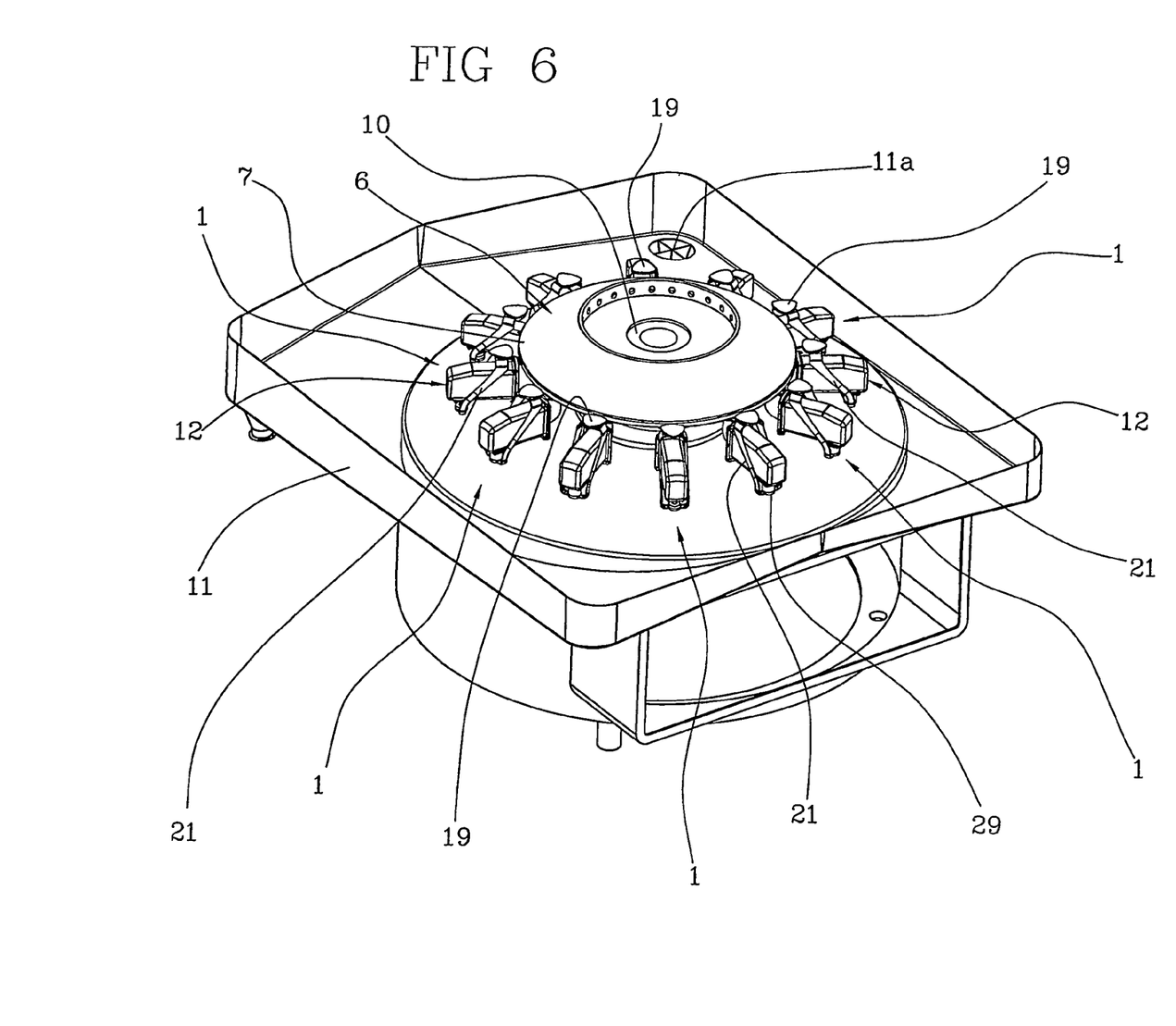
FIG. 6 shows a container filling unit, illustrated in perspective with certain parts omitted better to reveal others and equipped with the device for supporting containers according to the present invention.

Likewise preferably, as illustrated to advantage in FIG. 6, the filling unit 5 comprises a collection tank 11 located beneath the carousel 6 and serving to catch the washing liquid falling from the carousel 6 and the frame 9.

Thus, when cleaning operations are carried out on the unit 5 as a whole, the washing liquid will run off the outer surfaces of the frame 9, the supporting devices 1 and the carousel 6, and drain toward a waste outlet 11a in the tank 11.

Figure 2:
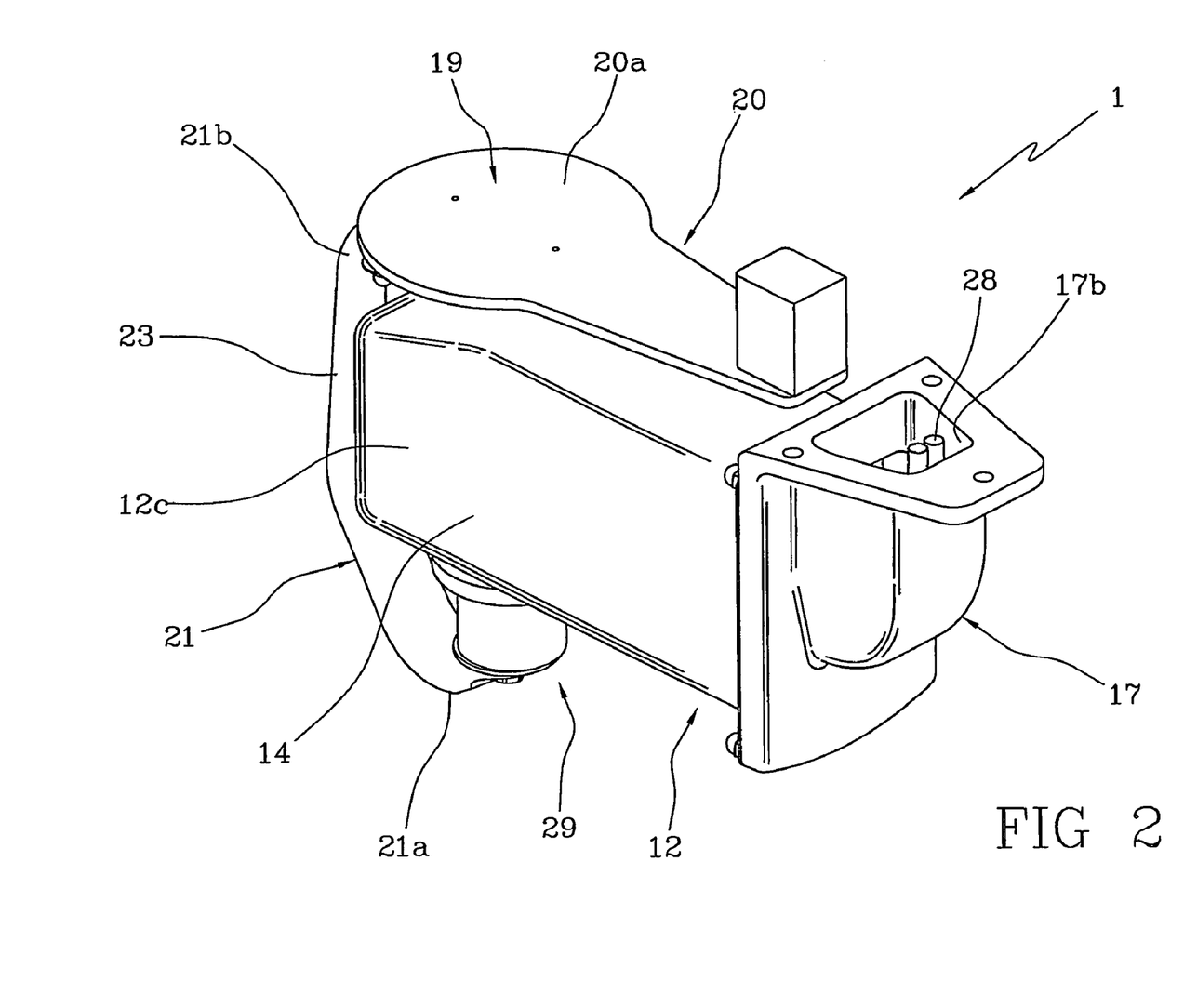
FIG. 2 shows the device for supporting containers according to the invention, viewed in perspective from above.
Figure 3:
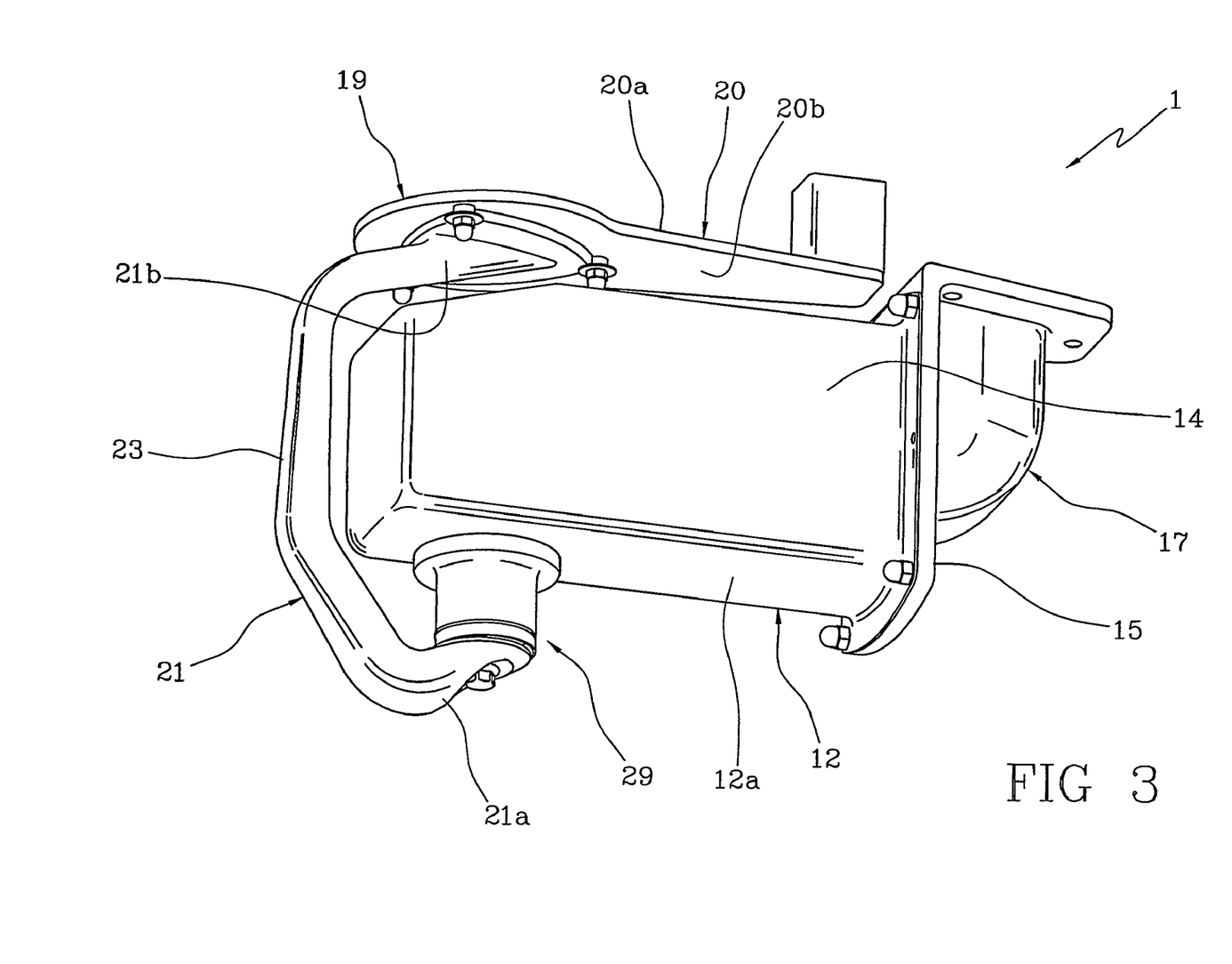
FIG. 3 shows the device for supporting containers according to the invention, viewed in perspective from beneath.
Figure 4:
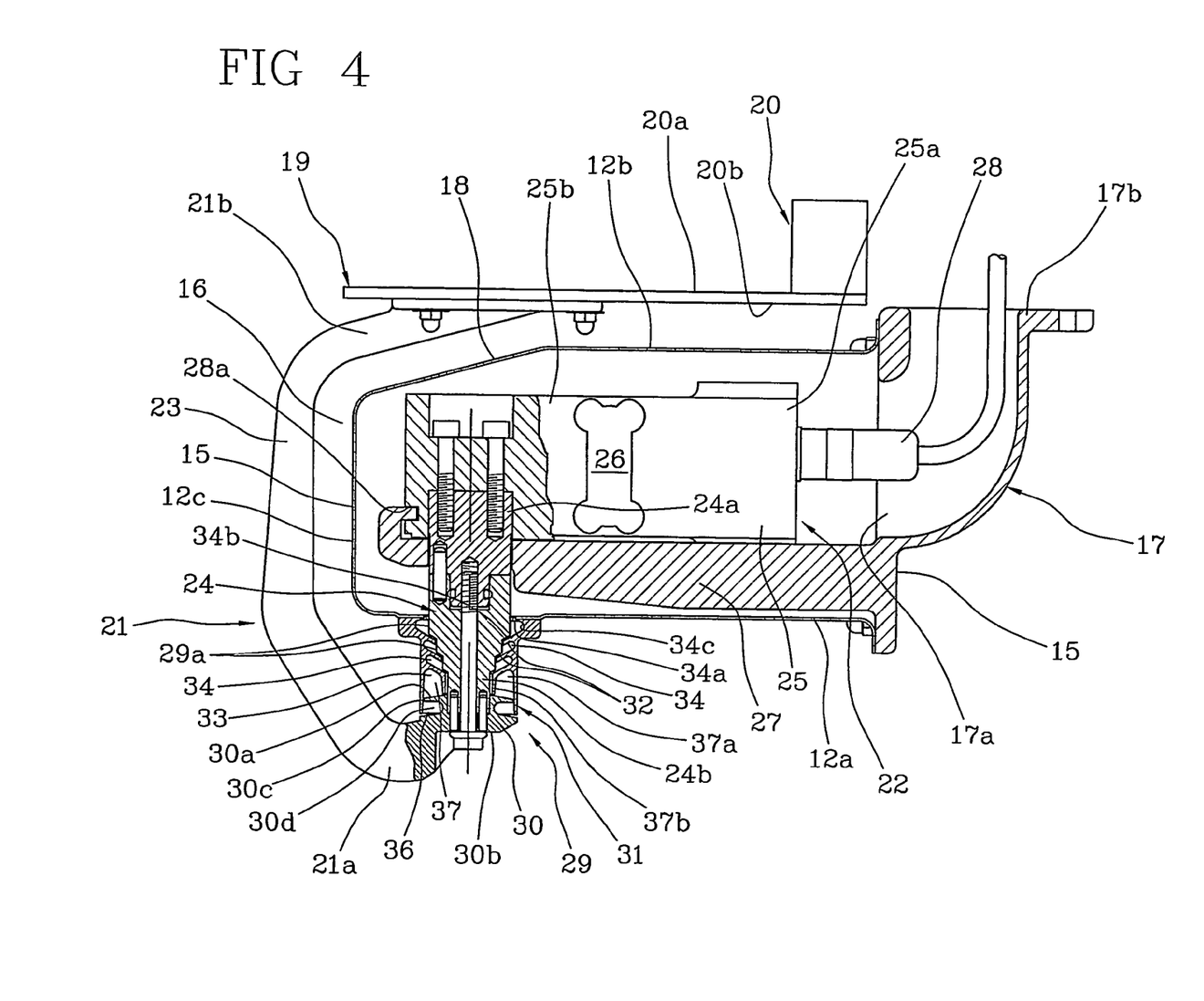
FIG. 4 is a longitudinal section through the device illustrated in FIGS. 2 and 3.

As illustrated to advantage in FIGS. 2, 3 and 4, the device 12 comprises a hollow body 12 such as can be associated with the aforementioned carousel 6.

In detail, the hollow body 12 is of substantially rectangular parallelepiped geometry, presenting a bottom surface 12a furnished with a through opening denoted 13, a top surface 12b opposite to the bottom surface 12a, and a side wall 12c joined to the top and bottom surfaces 12b and 12a.

More exactly, the bottom surface 12a is flat and horizontal, whilst the side wall 12c is disposed normal to the bottom surface 12a, interconnecting the top and bottom surfaces 12b and 12a. Moreover, the side wall 12c presents two mutually opposed larger faces 14 and two smaller faces 15, likewise mutually opposed. One of two smaller faces 15 coincides with a front section 16 of the device 1, directed away from the carousel 6. The remaining smaller face 15, directed toward the carousel 6, presents a communicating duct 17 of which a first end 17a is associated with the hollow body 12 and a second opposite end 17b is attached to the carousel 6.

As illustrated in FIG. 4, the duct 17 describes a bend, and the two aforementioned ends 17a and 17b are disposed mutually perpendicular. In this way, the second end 17b is attached to the underside of the carousel 6 whilst the hollow body 12 is carried by the first end 17a, cantilevered and extending beyond the transverse dimensional compass of the carousel 6.

The hollow body 12 is filled with a pressurized gas directed in through the communicating duct 17.

In particular, the carousel 6 comprises means (not illustrated, being only incidental to the invention) by which to deliver the aforementioned gas under pressure to a chamber internally of the carousel 6 and thence to the hollow body 12. Thus, the gas will disallow any infiltration of washing liquid into the hollow body 12 when directed onto the device 1.

The top surface 12b also presents a ramped area 18 forming part of the aforementioned front section 16 and serving to ensure that residual washing liquid deposited on the selfsame surface 12b will run off downwards (into the tank 11).

The device 1 also presents at least one pedestal 19 on which to stand a relative container 2, comprising a platform 20 positioned above the hollow body 12.

The platform 20 comprises a flat and horizontal top surface (FIG. 2) on which to stand the container 2, and a bottom surface 20b (FIG. 3) facing the top surface 12b of the hollow body 12.

The pedestal 19 further comprises a connecting element 21 of which a first end 21a is associated with weighing means 22 housed in the hollow body 12, as will be described more fully in due course, and a second end 21b fastened to the bottom surface 20b of the platform 20.

In detail, the connecting element 21 appears as an arm 23 substantially of C profile extending at least in part around the hollow body 12. As illustrated in FIG. 4, the arm 23 effectively circumscribes the front section 16 of the hollow body 12, with the second end 21b positioned above the top surface 12b of the body 12 and the first end 21a occupying the aforementioned through opening 13.

Figure 5:
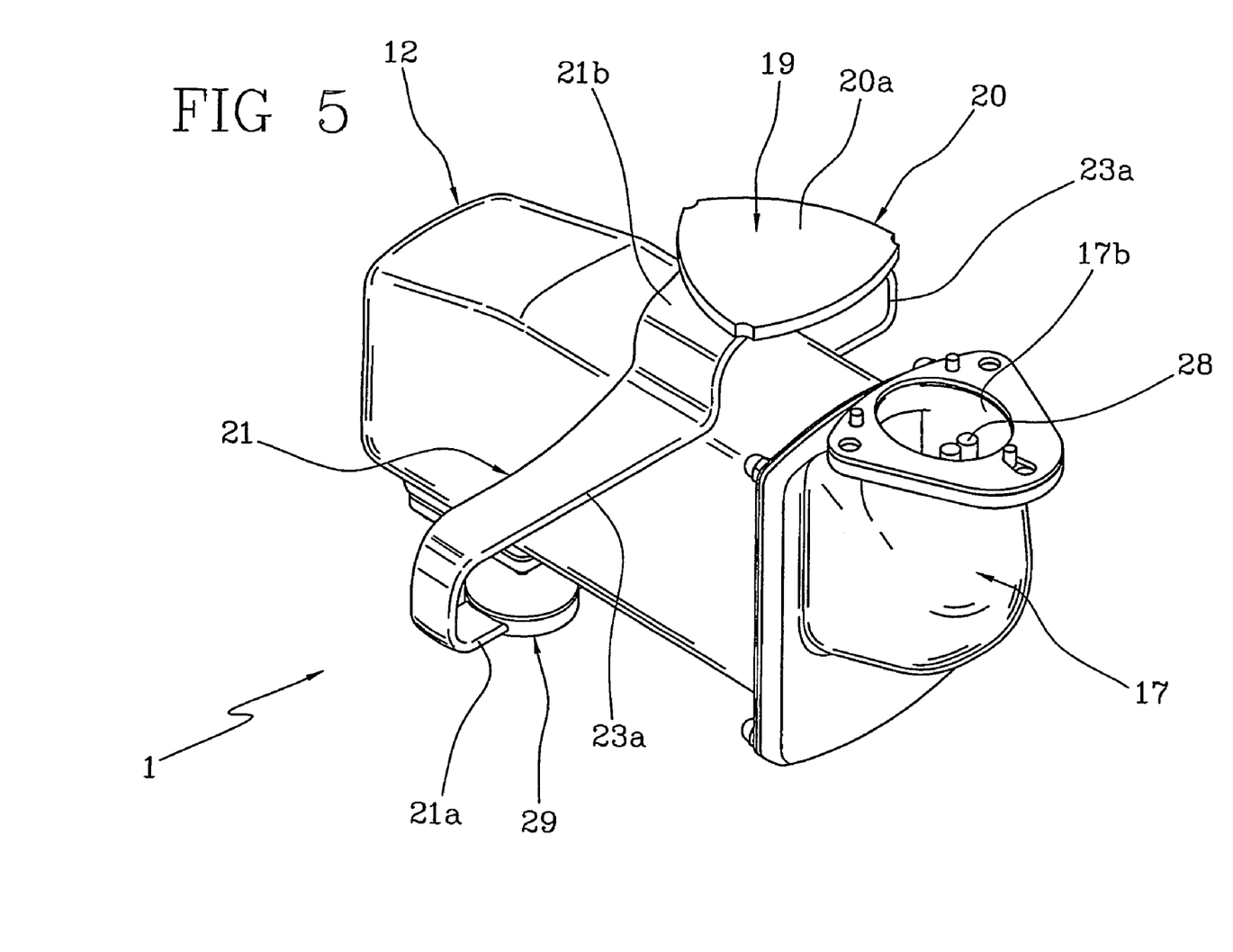
FIG. 5 illustrates a second embodiment of the supporting device, viewed in perspective.

In the example of FIG. 5 and FIG. 6, which show a second embodiment of the invention, the connecting element 21 presents two mutually parallel arms 23a positioned on opposite sides of the hollow body 12. In this solution, more exactly, the arms 23a are positioned flanking respective larger faces 14 of the hollow body 12 and connected one to another by way of respective first ends 21a and second ends 21b.

It will be seen that the first end 21a presents a cylindrical portion 24 insertable through and capable of movement within the aforementioned opening 13.

Occupying a position aligned longitudinally on the axis of the opening 13, the cylindrical portion 24 presents a top end 24a located internally of the hollow body 12 and a bottom end 24b located externally of the hollow body 12, projecting from the bottom surface 12a.

The top end 24a of the cylindrical portion 12 is associated with the weighing means 22 aforementioned, which preferably include a dynamometer 25.

The dynamometer 25 is embodied advantageously as a load cell of substantially rectangular parallelepiped appearance, comprising a rigid portion 25a anchored to the inside wall of the hollow body 12, and a movable portion 25b cantilevered from the rigid portion and coupled to the aforementioned top end 24a of the cylindrical portion 24.

The coupling between the top end 24a and the movable portion 25b is made with suitable connection means of conventional type, neither described nor illustrated in detail.

As illustrated to advantage in FIG. 4, the rigid portion 25a is associated with a smaller face 15 of the hollow body 12 remote from the front section 16, whereas the movable portion 25b is located adjacent to the smaller face 15 coinciding with the front section 16, and thus free to accompany the movement of the cylindrical portion 24.

It will be seen also that the dynamometer 25 presents a cavity 26 located between the rigid portion 25a and the movable portion 25b, serving to increase the flexible response of the dynamometer 25 during the movement of the cylindrical portion 24.

Also housed within the hollow body 12 is a stop 27 engaging a recess 28a in the movable portion 25b of the dynamometer 25. The stop 27 serves to ensure that the travel of the movable portion 25b induced by the cylindrical portion 24 remains within a safe limit, thereby preventing any risk of damage to the dynamometer caused by excessive flexural displacement of the movable portion 25b.

The weighing means 22 further comprise a connection component 28 located in the communicating duct 17, of which the function is to send an electrical signal to a control unit.

More exactly, the electrical signal will reflect the degree to which the movable portion 25b flexes relative to the fixed portion 25a, thereby indicating the weight of the container 2, and is relayed by the connection component 28 to a control unit of familiar type (neither illustrated nor described in detail) located preferably in the filling unit 5.

Thus, as the container 2 fills, the arm 23 will shift downwards, lowering the cylindrical portion 24 in the process. Consequently, the movable portion 25b flexes downward, generating the aforementioned signal to indicate the weight of the container 2.

As illustrated to advantage in the sectional view of FIG. 4, the device 1 further comprises sealing means 29 associated with the cylindrical portion 24 and serving to prevent any ingress of washing liquid into the hollow body 12 when cleaning operations are in progress.

The sealing means 29 in question coincide with the bottom end 24b of the cylindrical portion 24, which presents a substantially tapered profile when seen in longitudinal section, narrowing toward the bottom.

In greater detail, the bottom end 24b presents a plurality of concentric annular portions 29a, decreasing progressively in width the greater their distance from the top end 24a. Whilst there are four such portions 29a shown in the example illustrated, any given number might be incorporated, as dictated by constructional requirements.

Moreover, the longitudinal dimension of the annular portion 29a farthest from the top end 24a of the cylindrical portion 24 is greater than that of the remaining portions 29a.

The sealing means 29 further comprise a plurality of lateral surfaces 32 angled in relation to the longitudinal axis of the cylindrical portion 24, each interposed between two adjacent annular portions 29a. Thus, the annular portions 29a are associated one with the next and with no break in continuity.

Also forming part of the sealing means 29 is a disc portion 30 connected to the respective first end 21a of the arm 23 and associated with the bottom end 24b of the cylindrical portion 24. The disc portion 30 is aligned coaxially with the cylindrical portion 24 and appears wider than the annular portions 29a, when viewed in cross section. A top surface 30a of the disc portion 30 is offered to the bottom end 24b of the cylindrical portion 24, and a bottom surface 30b is offered to the arm 23. The top surface 30a and the bottom surface 30b are joined by a side wall 30c presenting an annular recess 30d aligned coaxially on the longitudinal axis of the cylindrical portion 24.

Finally, the sealing means 29 present a sleeve 31 associated with the through opening 13 afforded by the hollow body 12.

The sleeve 31 is substantially tubular and creates a cylindrical bore 33 that appears tapered when viewed in longitudinal section (FIG. 4), narrowing progressively away from the opening 13.

More particularly, the sleeve 31 presents a first end 31a engaging in fluid-tight contact with the bottom surface 12a of the hollow body 12 to prevent the ingress of washing liquid by way of the through opening 13, and an opposite second end 31b affording an access port 36. In addition, the sleeve 31 presents a plurality of mutually parallel and concentric annular cavities 34 created on an inside wall 35 of the tapered cylindrical bore 33.

In detail, each annular cavity 34 faces toward a respective annular portion 29a and is delimited by a top wall 34a and a bottom wall 34b, both angled in relation to the longitudinal axis of the cylindrical portion 24. The top and bottom walls 34a and 34b are parallel one with another and joined one to another by a back wall 34c of concave and substantially arched profile. In addition, the bottom wall 34b of each annular cavity 34 lies parallel with and facing a respective lateral surface 32, at least in part.

The sleeve 31 also presents an annular chamber 37 at the access port 36, coaxial with the annular cavities 34 and aligned with the annular portion 29a farthest from the top end 24a of the cylindrical portion 24.

More exactly, the annular chamber 37 is compassed between a first vertical wall 37a, and a second vertical wall 37b by which the corresponding annular portion 29a is divided from the selfsame chamber 37.

The access port 36 is occupied and substantially occluded in its entirety by the disc portion 30, so as to prevent the ingress of washing liquid via the selfsame port 36 into the cylindrical bore 33. In this situation, the annular chamber 37 is enclosed by the top surface 30a of the disc portion 30 and the annular recess 30d is positioned facing the inside wall 35 of the sleeve 31.

It will be appreciated that with this arrangement, the sealing means 29 create a labyrinth type trap in which washing liquid directed onto the first end 21a of the arm 23 is held and kept on the outside of the opening 13. In effect, when washing liquid enters the port 36, the recess 30d of the annular portion 30, the cylindrical bore 33 and the annular cavity 34 function as respective chambers in which the liquid will be retained.

In addition, with the top and bottom walls 34a and 34b of each annular cavity 34 angled down toward the port 36, liquids are able to trickle back naturally toward the selfsame port 36.

It will be seen also that the succession of annular cavities 34, increasing in size as the distance from the port 36 increases, defines a convoluted path along which liquid particles tending to infiltrate the opening 13 are progressively eliminated.

Liquid directed onto the entire device 1 runs down the hollow body 12 toward the collection tank 11 of the unit 5 (FIG. 1), and therefore will not linger on any of the exposed surfaces; neither can the liquid drop into the hollow body 12 through the opening 13, which in accordance with the invention is located on the underside of the selfsame body 12.

The presence of pressurized gas inside the hollow body 12 also ensures that liquids are kept out, even when penetrating to the point of infiltration.

The invention claimed is:

1. A device for supporting and weighing containers comprising:
   a hollow body such as can be associated with a respective unit for filling at least one container, the hollow body including a bottom surface;
   a weighing device, located in the hollow body, for weighing the container;
   at least one pedestal supporting the container, the pedestal including a platform on which to stand the container, and a connecting element having a first end associated with the weighing device, and a second end, opposite to the first end, associated with the platform,
   wherein the first end of the connecting element extends into a through opening located in the bottom surface of the hollow body;
   a sealing mechanism positioned in the through opening for preventing ingress into the hollow body of a washing liquid directed onto the device;
   wherein the sealing mechanism forms a labyrinth type path having a succession of chambers;
   wherein the latform is sositioned above the hollow body;
   wherein the connecting element includes an arm substantially of "C" shaped profile extending at least partly around the hollow body;
   wherein the first end of the connecting element includes a cylindrical portion passing through the through opening and accommodated at least partly within the hollow body;
   wherein the weighing device includes a dynamometer coupled to the cylindrical portion;
   wherein the cylindrical portion comprises a top end located within the hollow body and a bottom end located externally of the hollow body, and the dynamometer includes a rigid portion anchored to an inside wall of the hollow body, and a movable portion cantilevered from the rigid portion and coupled to the top end of the cylindrical portion.

2. A device as in claim 1, and further comprising a sealing mechanism coupled to the cylindrical portion for preventing ingress into the hollow body of a washing liquid directed onto the device.

3. A device as in claim 2, wherein the sealing mechanism coincides with the bottom end of the cylindrical portion, which includes a substantially tapered profile when viewed in longitudinal section and comprises a plurality of annular portions disposed concentrically one alongside the next, decreasing progressively in width the greater their distance from the top end.

4. A device as in claim 3, wherein the sealing mechanism comprises a plurality of lateral surfaces angled in relation to a longitudinal axis of the cylindrical portion, each interposed between two adjacent annular portions.

5. A device as in claim 4, wherein the sealing mechanism further comprises a disc portion disposed coaxially with the cylindrical portion, located between the arm and the bottom end of the cylindrical portion in a position remote from the top end, and having an annular recess aligned coaxially on the longitudinal axis of the cylindrical portion.

6. A device as in claim 5, wherein the sealing mechanism further comprises a sleeve positioned at the through opening and having a cylindrical bore of tapered section, narrowing progressively away from the through opening and accommodating the bottom end of the cylindrical portion.

7. A device as in claim 6, wherein the sleeve includes a plurality of mutually parallel and concentric annular cavities created on an inside wall of the cylindrical bore, positioned such that each annular portion faces a respective annular cavity.

8. A device as in claim 7, wherein each annular cavity is delimited by a top wall and a bottom wall, both angled transversely to the longitudinal axis of the cylindrical portion and parallel one with another, and positioned such that the bottom wall of each annular cavity lies parallel with and facing a respective lateral surface at least in part.

9. A device as in claim 8, wherein each annular cavity includes a back wall of concave profile joining the respective top wall to the bottom wall.

10. A device as in claim 9, wherein the sleeve includes a first end associated with the opening, and a second end, opposite to the first end, affording an access port of shape and proportions such as to accommodate the disc portion with the relative annular recess positioned facing the inside wall of the sleeve.

11. A device as in claim 10, wherein the hollow body includes a top surface opposed to the bottom surface and located beneath the platform, and a side wall disposed perpendicularly to and associated with the top surface and the bottom surface.

12. A device for supporting and weighing containers comprising:
a hollow body such as can be associated with a respective unit for filling at least one container, the hollow body including a bottom surface;
a weighing device, located in the hollow body, for weighing the container;
at least one pedestal supporting the container, the pedestal including a platform on which to stand the container, and a connecting element having a first end associated with the weighing device, and a second end, opposite to the first end, associated with the platform,
wherein the first end of the connecting element extends into a through opening located in the bottom surface of the hollow body;
a sealing mechanism positioned in the through opening for preventing ingress into the hollow body of a washing liquid directed onto the device;
wherein the sealing mechanism forms a labyrinth type path having a succession of chambers;
wherein the platform is positioned above the hollow body;
wherein the connecting element includes an arm substantially of "C" shaped profile extending at least partly around the hollow body;
wherein the hollow body includes a top surface opposed to the bottom surface and located beneath the platform, and a side wall disposed perpendicularly to and associated with the top surface and the bottom surface;
wherein the top surface includes a ramped area by which a washing liquid deposited on the surface is directed downwards.

13. A device as in claim 11, wherein the hollow body is of substantially rectangular cross section, and the arm extends around a front section of the hollow body coinciding with one smaller side of the rectangular section.

14. A device for supporting and weighing containers comprising:
a hollow body such as can be associated with a respective unit for filling at least one container, the hollow body including a bottom surface;
a weighing device, located in the hollow body, for weighing the container;
at least one pedestal supporting the container, the pedestal including a platform on which to stand the container, and a connecting element having a first end associated with the weighing device, and a second end, opposite to the first end, associated with the platform,
wherein the first end of the connecting element extends into a through opening located in the bottom surface of the hollow body;
a sealing mechanism positioned in the through opening for preventing ingress into the hollow body of a washing liquid directed onto the device;
wherein the sealing mechanism forms a labyrinth type path having a succession of chambers;
wherein the platform is positioned above the hollow body;
wherein the connecting element includes an arm substantially of "C" shaped profile extending at least partly around the hollow body;
wherein the first end of the connecting element includes a cylindrical portion passing through the through opening and accommodated at least partly within the hollow body;
wherein the weighing device includes a dynamometer coupled to the cylindrical portion;
and further comprising a communicating duct of which a first end is associated with the hollow body and a second end opposite to the first end is associated with a carousel supporting the device.

15. A device as in claim 14, wherein the weighing mechanism further comprises a connection component positioned in the communicating duct and associated with the dynamometer, by which a signal representing a weight of the container is sent to a control unit.

16. A unit for filling containers, comprising:
a carousel rotating about a respective vertical axis and having a plurality of peripheral stations accommodating respective containers;
a plurality of elements dispensing a fluid or powder product, each located above a corresponding peripheral station, by which the product is directed into a respective container;

wherein each peripheral station is equipped with a device for supporting and weighing containers, comprising:

a hollow body such as can be associated with a respective unit for filling at least one container, the hollow body including a bottom surface;

a weighing device, located in the hollow body, for weighing the container, at least one pedestal supporting the container, the pedestal including a platform on which to stand the container, and a connecting element having a first end associated with the weighing device, and a second end, opposite to the first end, associated with the platform, wherein the first end of the connecting element extends into a through opening located in the bottom surface of the hollow body;

a sealing mechanism positioned in the through opening for preventing ingress into the hollow body of a washing liquid directed onto the device;

wherein the sealing mechanism forms a labyrinth type path having a succession of chambers;

wherein the platform is positioned above the hollow body;

wherein the connecting element includes an arm substantially of "C" shaped profile extending at least partly around the hollow body;

wherein the first end of the connecting element includes a cylindrical portion passing through the through opening and accommodated at least partly within the hollow body;

wherein the weighing device includes a dynamometer coupled to the cylindrical portion;

wherein the cylindrical portion comprises a top end located within the hollow body and a bottom end located externally of the hollow body, and the dynamometer includes a rigid portion anchored to an inside wall of the hollow body, and a movable portion cantilevered from the rigid portion and coupled to the top end of the cylindrical portion.

* * * * *